March 11, 1930. J. T. GORE 1,750,040
INCLOSURE FOR AUTOMOBILES
Original Filed Aug. 11, 1927    7 Sheets-Sheet 1
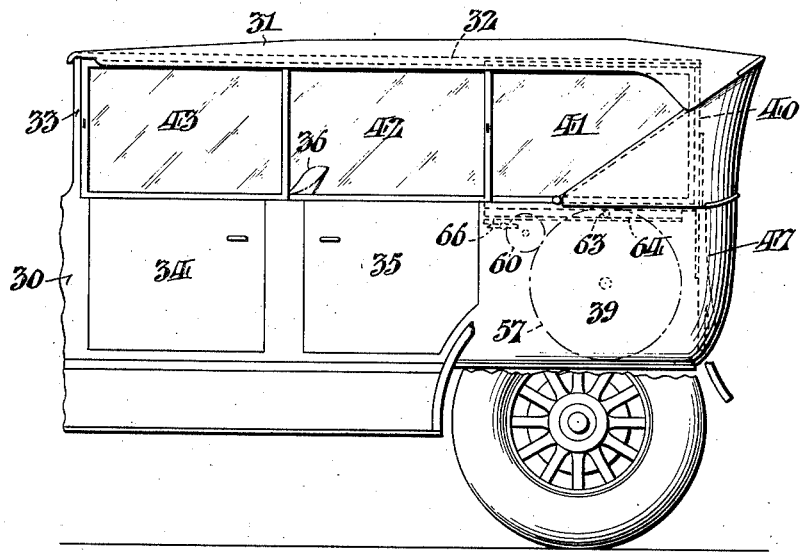
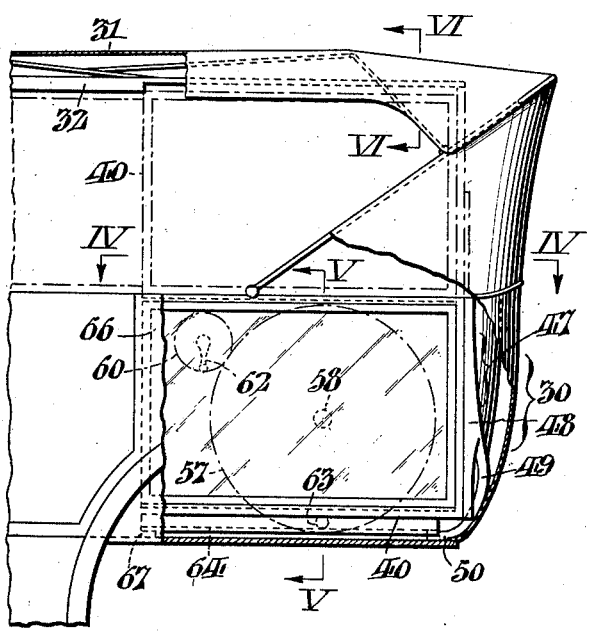
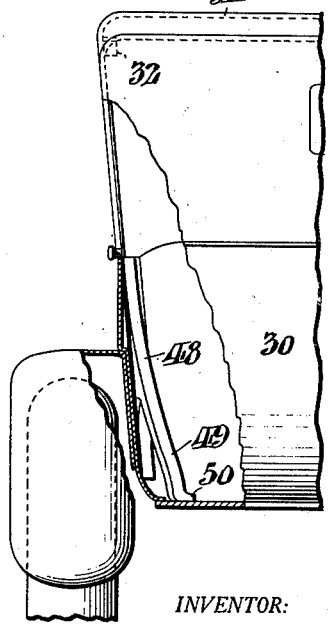
INVENTOR:
Jehu T. Gore,
BY Fraley Paul
ATTORNEYS.

March 11, 1930.  J. T. GORE  1,750,040
INCLOSURE FOR AUTOMOBILES
Original Filed Aug. 11, 1927  7 Sheets-Sheet 2
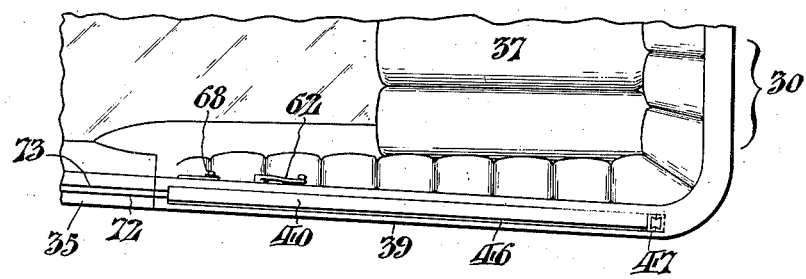
FIG. IV.
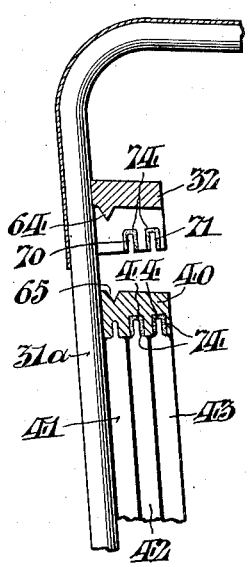
FIG. VI.
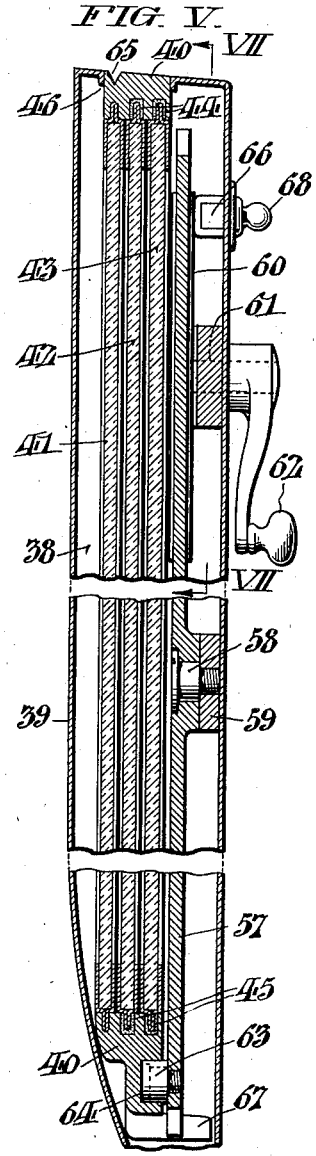
FIG. V.
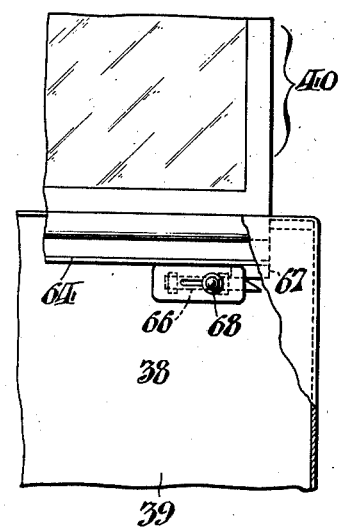
FIG. VII.
WITNESSES
Thomas W. Kerr Jr.
John A. Weidler
INVENTOR:
Jehu T. Gore,
BY Fraley Paul
ATTORNEYS.

March 11, 1930.　　　　　J. T. GORE　　　　　1,750,040
INCLOSURE FOR AUTOMOBILES
Original Filed Aug. 11, 1927　　7 Sheets-Sheet 3
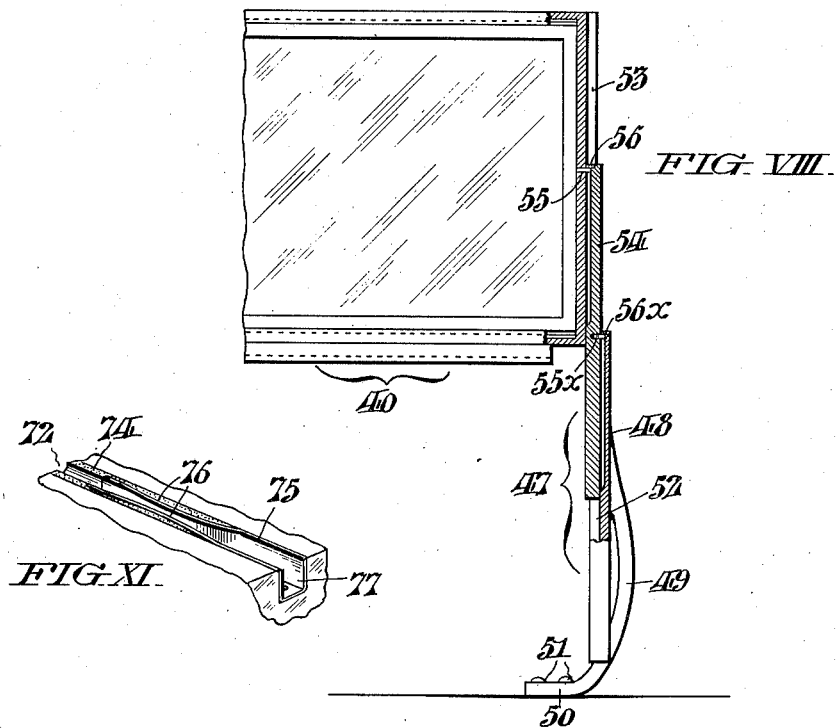
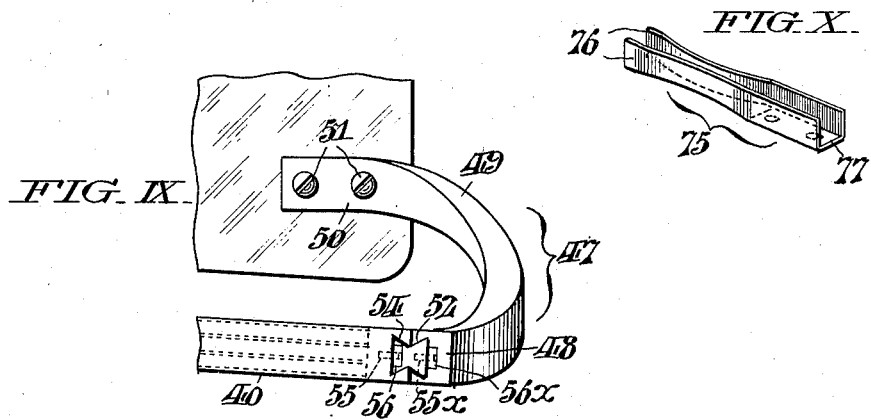
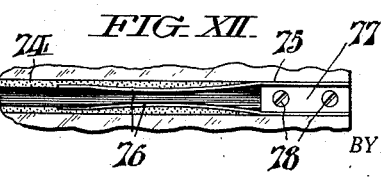
WITNESSES　　　　　　　　　　　　　　　　INVENTOR:
　　　　　　　　　　　　　　　　　　　　　John T. Gore,
　　　　　　　　　　　　　　　　　　BY
　　　　　　　　　　　　　　　　　　　　　ATTORNEYS.

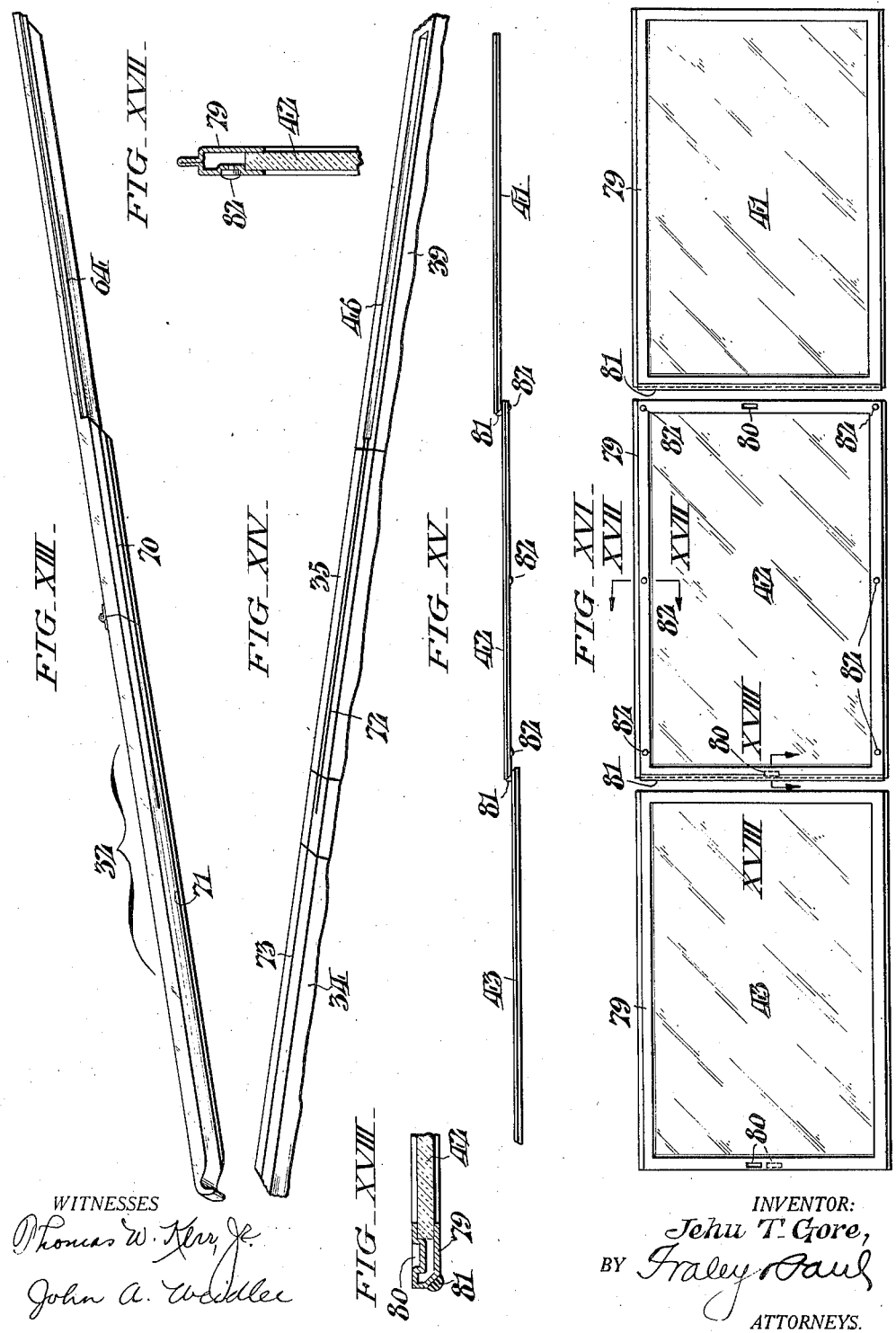

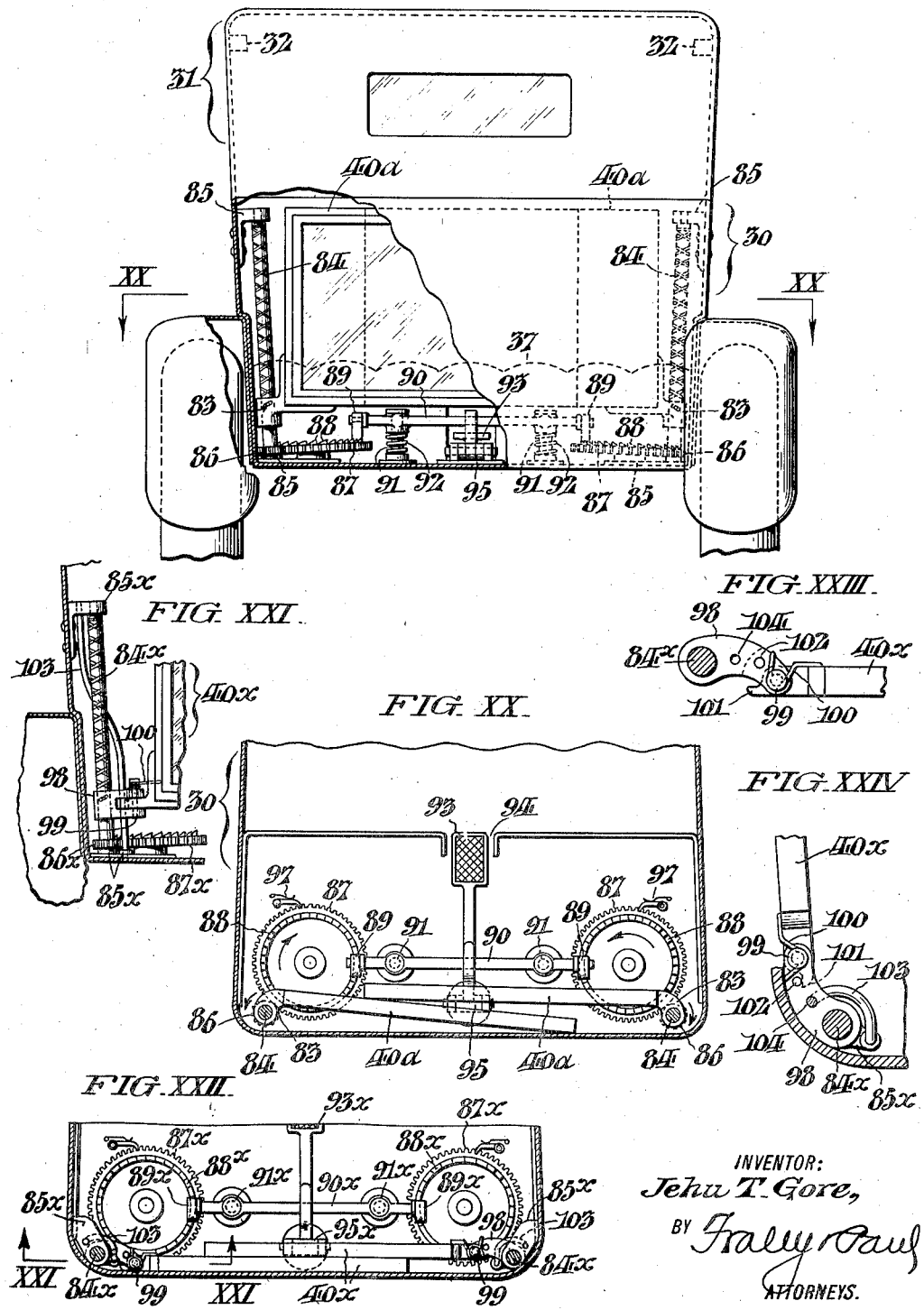

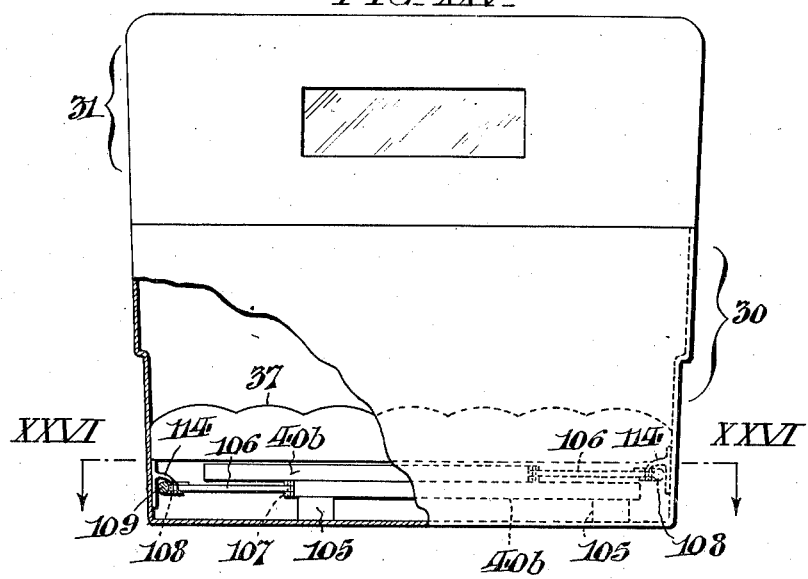
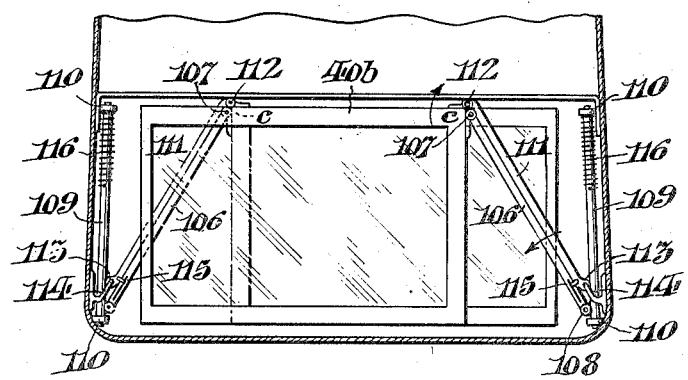

March 11, 1930. J. T. GORE 1,750,040
INCLOSURE FOR AUTOMOBILES
Original Filed Aug. 11, 1927 7 Sheets-Sheet 7
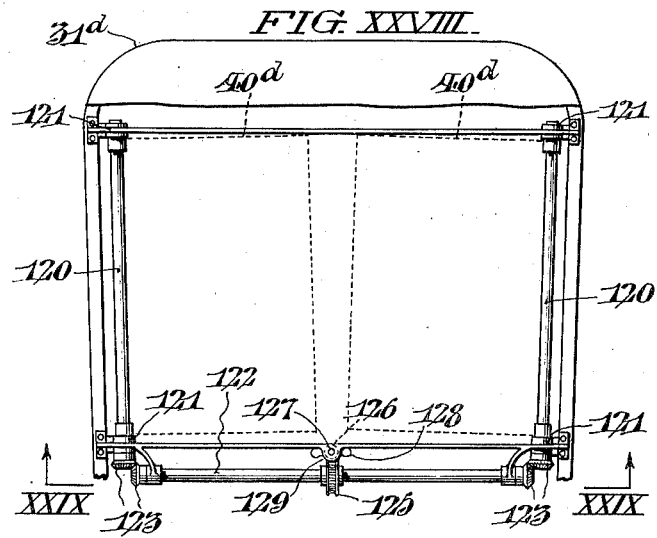
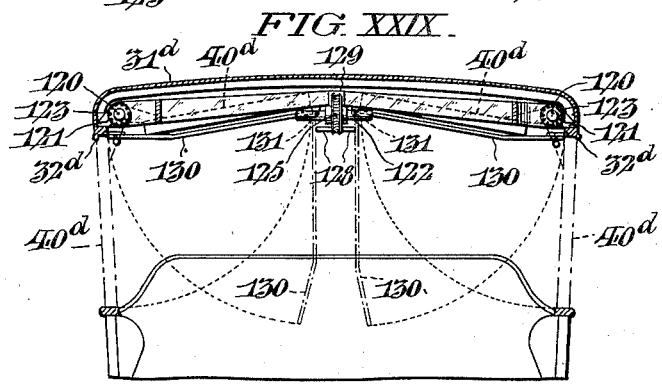
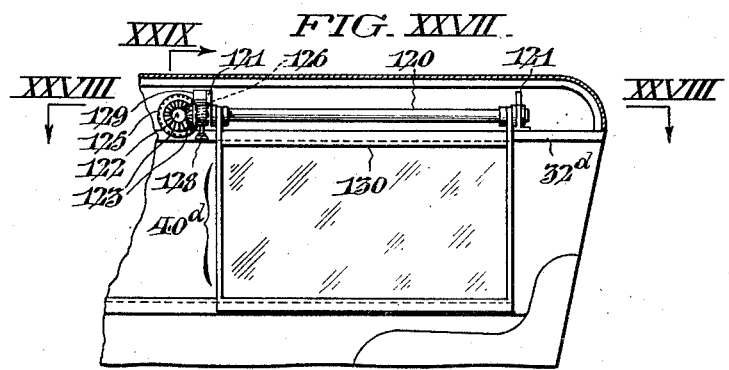
INVENTOR,
Jehu T. Gore,
BY
ATTORNEYS.

Patented Mar. 11, 1930

1,750,040

UNITED STATES PATENT OFFICE

JEHU T. GORE, OF DREXEL HILL, PENNSYLVANIA

INCLOSURE FOR AUTOMOBILES

Application filed August 11, 1927, Serial No. 212,165. Renewed June 4, 1929.

This invention relates to automobiles,—more particularly to cars of the open roadster or touring variety. Such automobiles are usually equipped either with flimsy auxiliary sliding curtains, or curtains which must be individually applied and removed, and which at best afford inadequate protection in inclement weather.

The main object of my invention is to overcome the foregoing drawbacks through provision of an inclosure enabling quick and ready conversion of an open car to all intents and purposes into an automobile of the inclosed type. This desiderata I secure in an organization which is compactly collapsible for accommodation in recesses or hollows of the vehicle body so as to be entirely concealed and out of the way when not in use, and which is moreover extremely sturdy yet light in weight, easy to manipulate, adaptable to different makes of automobiles, and on the whole, conducive to manufacture at comparatively small cost.

Briefly described, my invention comprises magazine carriers with sliding sashes adapted for distribution horizontally along opposite sides of the vehicle body under guidance of upper and lower guide grooves provided in the horizontals of the automobile top or roof, and in the hand rails. Manipulating means are provided to properly position the magazine carriers for distribution of the sashes in the manner aforesaid, said manipulating means being susceptible to variation in accordance with the allocation chosen for concealment of the sash carriers,—all as hereinafter fully explained.

In the drawings herewith Fig. I is a fragmentary illustration, partly in side elevation and partly in section, of an automobile equipped with my inclosure in a form adapted, when collapsed, for accommodation in the hollow posterior side walls of the vehicle body.

Fig. II is a similar view on a somewhat larger scale showing one of the sash carriers in the normal lowered position out of the way.

Fig. III is a fragmentary end view of the automobile with portions broken away and in section to emphasize certain important details of the form of inclosure shown in the preceding illustrations.

Fig. IV is a fragmentary horizontal sectional view taken locally as indicated by the arrows IV—IV in Fig. II.

Fig. V is a vertical sectional view on a larger scale taken as indicated by the arrows V—V in Fig. II.

Fig. VI is a local detail section in accordance with the arrows VI—VI in Fig. II with one of the carriers on its way to meet the top horizontal at the corresponding side of the vehicle.

Fig. VII is a detail illustration viewed as indicated by the arrows VII—VII in Fig. V and showing the means provided for locking the magazine sash carriers in elevated position.

Fig. VIII is a detail view showing the extensile means for guiding the sash carriers to true vertical movement.

Fig IX is a plan view of the parts shown in Fig. VIII.

Fig. X is a perspective view of a metallic facing clip which I provide for protection of the weathering in the guide grooves for the sliding sashes.

Fig. XI is a perspective view showing one of the facing clips in place in the groove.

Fig. XII is a fragmentary plan view showing the manner in which the facing clips are secured in the grooves.

Fig. XIII is a perspective view of one of the horizontal rails of the automobile roof or top showing the guide grooves to take upper edges of the sliding sashes.

Fig. XIV is a similar view of the hand rail at one side of the vehicle showing the grooves to take the lower edges of the sliding sashes.

Fig. XV is a plan view showing the sashes extended and the means to form weather tight junctures at the overlap margins.

Fig. XVI is a side view of the sashes corresponding to their position in Fig. XV.

Figs. XVII and XVIII are detail sectional views taken as respectively indicated by the arrows XVII—XVII and XVIII—XVIII in Fig. XVI.

Fig. XIX is a rear view of an automobile with a portion broken away and in section showing an alternative form of my invention in which the sash carriers are normally concealed within the hollow behind the rear seat.

Fig. XX is a plan section taken as indicated by the arrows XX—XX in Fig. XIX with the rear seat removed.

Figs. XXI and XXII are fragmentary views similar to Figs. XIX and XX showing modifications employable in connection with the form of my invention illustrated by the latter figures.

Figs. XXIII and XXIV are details of parts associated with the modification of Figs. XXI and XXII.

Fig. XXV is a view similar to Fig. XIX showing still another alternative form of my invention in which the sash carriers are concealed beneath the rear seat of the automobile.

Fig. XXVI is a plan section in accordance with the arrows XXVI—XXVI in Fig. XXV.

Fig. XXVII is a sectional view showing an arrangement wherein the inclosure parts are concealed beneath the roof of an automobile having a rigid or non-collapsible top.

Fig. XXVIII is a plan section in accordance with the arrows XXVIII—XXVIII in Fig. XXVII; and Fig. XXIX is a cross detail section taken as indicated by the arrows XXIX—XXIX in Figs. XXVII and XXVIII.

Referring first to the form of my invention illustrated in Figs. I to IX of these illustrations, 30 designates the body of a standard type of touring car, characterized by the customary "one man" foldable roof or top 31 whereof the covering is supported in part by longitudinals 32 adapted to engage at their forward ends over the top edge of the windshield 33. At opposite sides, the body 30 has the usual swinging doors 34, 35 affording access to the front and back seats 36, 37. In accordance with standard practice, the sides (including the doors 34, 35) and back of the body 30 are constructed hollow from sheet metal; and in the form of my invention under consideration, I employ the recesses or cavities 38 in the posterior body panels 39 for concealment and protection of the inclosure when the same is not in use. The parts constituting the inclosure are duplicated for opposite sides of the vehicle, and in each case, a U shaped frame 40—open at the forward end—serves as a carrier for a number of (in the present instance three) glazed sashes 41, 42, 43, the first of these being fixed while the others are slidable in grooves 44, 45 in the upper and lower bars of said frame, see Fig. V. Each carrier 40 is projectable vertically through a slot 46 in the top edge (hand rail) of the corresponding posterior side panel 39, to the position shown in dot and dash lines in Fig. II, under guidance of an extensile means comprehensively designated 47. This extensile means 47 embodies an upright bracket 48 (Figs. II, III, IV, VIII and IX) with a laterally-reaching extremity 49 which is suitably configured to fit the rounded rear corner of the automobile body and terminates in an anchorage or foot 50 adapted to be secured fast to the floor boards by means of screws or bolts 51. The bracket 48 and the contiguous vertical frame bar of the carrier 40 have longitudinally-extending opposing dove-tail grooves 52, 53 for engaging an intervening connecting rod 54 of corresponding cross-section with a sliding fit, the parts just described being restrained against complete separation by pins 55, 55$^\times$ that cooperate with stops 56, 56$^\times$, see Fig. VIII.

The means provided in each instance for lifting the sash carrier 40 includes a disk in the form of a gear wheel 57 that is rotatable about a fixed stud 58 projecting from a suitable support 59 within the body recess 38, and arranged to be driven by an intermeshing pinion 60. The axis 61 of this pinion 60 extends through the inner wall of the panel 39 to afford attachment for an operating crank handle 62 which is conveniently accessible from the rear seat 37 of the vehicle. Near its periphery, the gear wheel 57 carries a lateral projection in the form of a roller 63 to engage a groove 64 along the lower horizontal frame bar of the carrier 40. With this arrangement, as the crank handle 62 is rotated, it will be apparent that the carrier 40 is gradually raised from the position of concealment through the slot 46 at the top of the hollow body panel 39 until its upper frame bar contacts with the nether face of the corresponding roof longitudinal 32. As shown in Figs. V, VI and XIII, the parts 32 and 40 are respectively provided with a wedge tongue 64 and a groove 65 adapted to interengage and form an anti-rattle and weather tight juncture. Incidentally to the operation just explained, the carrier 40 is definitely guided and at the same time supported against swaying incidentally to its elevation. As a means to hold the parts in the raised position, I provide a spring-influenced latch bolt 66 (Figs. V and VII) for cooperation with a lug 67 on the carrier 40, said bolt having an actuating knob 68 which projects through a slot in the inner wall of the posterior body panel 38. As shown in Fig. VII, the latch bolt 66 is beveled at its forward end to facilitate its projection beneath the lug 67 during elevation of the carrier 40. With the carrier 40 now raised and locked, the movable sashes 42, 43 are next withdrawn and slid horizontally along the side of the vehicle body until they occupy positions over the doors 35, 34 as shown in Fig. I, the fixed sash 41 of course remaining with the carrier over the posterior panel 39. Such shifting of the sashes is guided by complemental upper and lower retaining grooves 70, 71 and 72, 73 respectively in the top horizontal and in the hand rail or ledge along the side of the automobile body, see Figs. XIII and XIV, said grooves aligning with the grooves 44—45 in the upper and lower frame bars of the carrier 40. It is to be particularly noted that the grooves 71, 73 for the forward sash 43 extend all the way to the front of the automobile body, while the grooves 70, 72 extend only part way, thereby determining the projected position of the sash 42.

The grooves 44, 45 in the carrier 40 as well as the guide grooves 70—73 are all lined with felt or other suitable weathering as instanced at 74 in Figs. V, VI, XI and XII, to prevent rattle and at the same time insure air and water tightness. To protect the weathering against injury and to ease movement of the sashes over the breaks in the grooves 70—71 for example, in the regions of the hinge knuckle of the top horizontals 32 and the grooves 72—73 of the hand rails at the junctures of the doors 34, 35, I provide facing clips 75 whereof one is shown in perspective in Fig. X. These clips may be conveniently fashioned from thin springy sheet metal with opposed slightly-convexed tongues 76 that extend from a channelled anchorage portion 77 having a width to snugly fit the sash grooves as shown in Figs. XI and XII and with perforations to take securing screws 78. Thus as a sash is advanced in the guide and retaining grooves, the leading edge first encounters the opposed spring tongues of the clips with the result that its entry is eased to the extent of preventing injury to the weathering 74 in said guide grooves at the interruptions aforementioned.

Although the sashes 41, 43 may be wholly of glass, I prefer to surround the panes with perimetric frames 79 formed from very thin sheet metal with tongues top and bottom to fit the several guide grooves 44, 45, 70—73. At convenient points inside and outside, the sash frames 79 are provided with finger recesses 80 (Figs. XVI and XVIII) for convenience in sliding them. To insure weather tightness at the overlapping areas, the vertical forward edges of the sashes 41 and 42 are beveled and faced with liners 81 of rubber or the like. The liners 81 have lateral projection to contact with the sashes 42 and 43 respectively, see Figs. XV, XVI and XVIII. The intermediate sash 42 is moreover equipped at suitable points with buffer buttons 82 of rubber to prevent rattle when nested side by side with the others in the carrier 40. Also to determine weather-tightness between the fixed pane in the carrier 40, and the diagonal extremities of the hinged cross brace 31ª of the top 31, I line the insides with a yielding strip of rubber or felt. When the inclosure is in service, the doors 34, 35 may be individually used simply by sliding back the corresponding sashes 42, 43 along their retaining grooves. Collapse is effected in a manner reverse to that above explained, —the operation being so obvious as to preclude the necessity for separate description.

In the alternative embodiment of my invention illustrated in Figs. XIX and XX, the sash carriers 40ª serving the two sides of the vehicle are normally concealed behind the rear seat 37. As shown, each carrier 40ª is supported at one of its lower corners by a bracket fitting 83 engaging an extensile means in the form of a reversely-threaded vertical jack screw 84 located in the corresponding rear corner of the car body 30 and sustained for free rotation by suitable fixed upper and lower bearings 85. At their lower ends, the shafts 84 are equipped with pinions 86 that mesh with gear wheels 87 revolving on fixed axes. On their upper faces, the gear wheels 87 have ratchet teeth 88 adapted to be picked by pawls 89 at opposite ends of a cross bar 90 which is confined to up and down movement by stationary upright guide studs 91. The cross bar 90 is normally maintained in the elevated position shown in Fig. XIX against stop heads at the tops of the guide studs 91, by springs 92. A pedal 93, accessible through a frontal opening 94 beneath the seat is fulcrumed on a fixed bracket 95, and at an intermediate point is operatively connected to the cross bar 90. At each depression of the pedal 93 it will be seen that the cross bar 90 is moved downward in opposition to the springs 92, such movement being communicated by the pawls 89 to the gear wheels 87 and in turn by the latter to the pinions 86. The vertical jack screws 84 are accordingly always rotated in the direction of the arrows in Fig. XX, counter-movement of the parts being prevented by stop detents 97 engaging the teeth of the gear wheels 87. By successive intermittent rotative movements thus imparted to the jack screws 84, the sash carriers 40ª are simultaneously elevated, and when the level of the arm rails along the sides of the car body is attained, may be swung about said screws into line for horizontal distribution of the sashes exactly as explained in connection with my first described embodiment. Lowering of the sash carriers 40ª is likewise accomplished with the aid of the pedal-operated actuating mechanism by virtue of the self reversing action of the jack-screws 84.

In the modifications of Figs. XXI–XXIV knuckle joint arms 98 provide additional pivot connections at 99 between the sash carriers 40ˣ and the jack screws 84ˣ. As shown in Fig. XXII, this arrangement enables closer compacting of the sash carriers 40ˣ, i. e. lying flat against one another and against the back wall of the automobile body, and is therefore especially advantageous in instances where the available space behind the rear seat is very limited. The knuckle joint arms 98 are curved so as to lay snugly within the rounded corners of the vehicle body, as shown in Fig. XXIV, when the sash carriers occupy the active position. The illustrated relation of the parts in the figure last referred to is determined and maintained by aid of torsion springs 100 incorporated in the pivot connections 99 in conjunction with lugs 101 of the sash carriers 40<sup>x</sup> adapted to engage the stops 102 on the arms 98. For details of these features, refer particularly to Fig. XXIII. The modification of Figs. XXI–XXIV also affords a means to effect automatic swinging of the sash carriers 40<sup>x</sup> laterally outward incidentally to being raised by the jack screws 84<sup>x</sup>, said means having the form of spiralized guide rods 103 twisted substantially through an angle of 90° concentrically with the screws, and rigidly secured top and bottom in the brackets 85<sup>x</sup>. As shown in Figs. XXI–XXIV the knuckle joint arms 98 are pierced as at 104 for sliding engagement on the rods 103. Thus, as the jack screws 84<sup>x</sup> are rotated to elevate the sash carriers 40<sup>x</sup>, the latter are obliged to follow the course prescribed by the guide rods 103 and are thereby automatically swung outward until they finally assume the position shown in Fig. XXIV, the torsion springs 100 acting to bring about engagement between the lugs 101 and the stops 102 immediately upon initiation of the movement of the sash carriers from the stored position of Fig. XXII. The manipulating mechanism employed will be observed as otherwise identical with that shown in Figs. XIX and XX, the corresponding parts being indicated by the same reference numerals with the subscript $x$ and therefore needing no further explanation.

In the form of my invention shown in Figs. XXV and XXVI, the sash carriers 40<sup>b</sup> are normally accommodated horizontally in the hollow beneath the rear seat 37 of the automobile, one lying on top of the other and the lower of the two resting on suitable supports shown at 105. In order to guide the carriers 40<sup>b</sup> into proper position above the arm rails of the car body incidentally to being lifted, I provide in each instance an extensile means or arm 106 which at one end has a swivel connection 107 with the lower rear corner $c$ of the carrier (as considered with reference to the position it occupies when the carrier is raised) and at the other end, a similar connection 105 with a rock shaft 109. This shaft 109 extends fore and aft in close proximity along the corresponding side wall of the car at a slight elevation from the floor where it is rotatively supported by opposite end bearings 110. Associated with each arm 106 is a parallel thrust bar 111 having a fulcrum connection at one extremity with the sash carrier 40<sup>b</sup> at a point 112 beyond the swivel 107. At the other extremity, the thrust bar 111 has an aperture 113 to engage a hooklike cam 114 shown, for convenience of illustration, as fixed to the side wall of the car body. A pin and slot connection 115 acts to hold the thrust bar 111 to longitudinal movement relative to the arm 106 as well as to prevent its separation therefrom laterally. With this arrangement, as the sash carrier 40<sup>b</sup> is lifted, it is obliged to turn bodily about the shaft 109 as an axis. As the movement proceeds, the hook cam 114 acts to draw upon the thrust bar 111 thereby causing the sash carrier 40<sup>b</sup> to turn on the swivel center 107 in the direction of the arrow in Fig. XXVI and the arm 106 gradually approach an upright position by concurrently induced rotation about the swivel center 108 in the direction likewise indicated in Fig. XXVI. When the movement is finally completed, it will be apparent that the carrier 40<sup>b</sup> is turned through an angle in two directions as a consequence of which its lower rail is brought to the plane of the arm rail of the automobile in readiness for withdrawal of the sashes. In order to ease the operation of this form of my invention, the shafts 109 are shown as equipped with torsion springs 116 to partly counter-balance the weight of the sash carriers 40<sup>b</sup>. It is however to be understood that any other appropriate counterbalancing means may be used in lieu of the springs.

In Figs. XXVII, XXVIII and XXIX I show my invention in a form suited to automobile bodies having a rigid or non-collapsible top 31<sup>d</sup> whereof I employ the hollow or concavity for storage of the sash carriers 40<sup>d</sup>. As shown the sash carriers 40<sup>d</sup> are secured to shafts 120, journalled on bearings 121 (which may be supported by the upper side longitudinals 32<sup>d</sup> of the car body) so as to be swingable downward from the idle full line position in Fig. XXIX to the active dot and dash line position with their lower horizontal frame rails resting on the arm rails of the automobile body. To simultaneously move the sash carriers 40<sup>d</sup>, I provide in the present instance a manipulating system embodying a transverse shaft 122 which is coordinated by bevel gears 123 with the shafts 120. At its center, the transverse shaft 122 has affixed to it a worm gear 125 which meshes with a driving worm 126 on a short vertical shaft 127 revolvable by means of an attached readily accessible handle 128, in a bearing 129 suitably supported under the roof.

When not in use, the sash carriers 40<sup>d</sup> are hidden from view by shutters 130 which close against and latch to the rails 32<sup>d</sup> as shown in full lines in Fig. XXIX. When the sash carriers 40<sup>d</sup> are to be lowered, the shutters 130 are swung down on their pivotal connections 131 with the roof as shown in dot and dash lines in Fig. XXIX. It will be apparent that the actuating worm gearing 125, 126 has capacity to hold the sash carriers 40ᵈ against displacement in any position to which they may be moved thereby obviating the necessity for special locking means for the purpose.

Having thus described my invention, I claim:

1. A collapsible inclosure for open vehicles comprising magazine carriers normally concealed in recesses or hollows of the vehicle body, each of such carriers accommodating a number of sliding sashes side by side, and means to move the carriers into position for distribution of the sashes horizontally along opposite sides of the vehicle.

2. A collapsible inclosure for open vehicles comprising magazine carriers normally concealed in recesses or hollows of the vehicle body, each of such carriers accommodating a number of sliding sashes side by side, means to move the carriers, and means to incidentally guide the carriers into position for distribution of the sashes horizontally along opposite sides of the vehicle.

3. A collapsible inclosure for open vehicles comprising magazine carriers normally concealed in recesses or hollows of the vehicle body, each of such carriers accommodating a number of sliding sashes side by side, means to move the carriers into position for distribution of the sashes horizontally along opposite sides of the vehicle, and latch means to lock the carriers against displacement in active position.

4. A collapsible inclosure for open vehicles comprising magazine sash carriers normally concealed in recesses or hollows of the vehicle body, means to move the carriers for distribution of the sashes horizontally along opposite sides of the vehicle, and latch means cooperating with lugs on the carriers to hold the latter against displacement in active position.

5. A collapsible inclosure for open vehicles comprising magazine carriers with sliding sashes adapted for horizontal distribution along opposite sides of the vehicle under guidance of retaining grooves in upper and lower horizontals of the body, said grooves being lined with weathering and the weathering protected against injury at junctures in the horizontals by clips providing a metallic facing to ease entry of the leading edges of the sashes.

6. A collapsible inclosure for open vehicles comprising magazine carriers normally concealed in recesses or hollows in the lower rear portion of the vehicle body, each of such carriers accommodating a number of sliding sashes side by side, and means to elevate the carriers into position for distribution of the sashes horizontally forward along the opposite sides of the vehicle.

7. A collapsible inclosure for open vehicles comprising magazine carriers normally concealed in recesses or hollows in the rear of the vehicle body, each of such carriers accommodating a number of sliding sashes side by side, means to move the carriers vertically and laterally into position for distribution of the sashes horizontally along opposite sides of the vehicle.

8. A collapsible inclosure for open vehicles comprising magazine carriers normally concealed in recesses or hollows in the rear of the vehicle body, each of such carriers accommodating a number of sliding sashes side by side, means to move the carriers, and means to incidentally guide the carriers vertically and laterally into position for distribution of the sashes horizontally along opposite sides of the vehicle.

9. A collapsible inclosure for open vehicles comprising magazine carriers normally concealed in recesses or hollows of the vehicle body, each of such carriers accommodating a number of sliding sashes side by side, and means to simultaneously move the carriers into position for distribution of the sashes horizontally along opposite sides of the vehicle.

10. A collapsible inclosure for open vehicles comprising magazine carriers normally concealed in recesses or hollows in the lower rear portion of the vehicle body, each of such carriers accommodating a number of sliding sashes side by side, means to simultaneously elevate the carriers into position for distribution of the sashes horizontally along opposite sides of the vehicle.

11. A collapsible inclosure for open vehicles comprising magazine carriers normally concealed in recesses or hollows of the vehicle body, each of such carriers accommodating a number of sliding sashes side by side, individually associated jack screws to move the carriers into position for distribution of the sashes horizontally along opposite sides of the vehicle, and manipulating means for simultaneously rotating the jack screws.

12. A collapsible inclosure for open vehicles comprising a pair of magazine carriers normally concealed in recesses or hollows of the vehicle body, each of such carriers accommodating a number of sliding sashes side by side, individually associated reversely threaded jack screws to vertically move the carriers with capacity for swinging them on the screw axes into position for distribution of the sashes horizontally along opposite sides of the vehicle, and manipulating means whereby the jack screws are continuously rotated in the same direction in placement of the carriers as aforesaid and in returning them to the recesses or hollows aforesaid.

13. A collapsible inclosure for open vehicles comprising magazine sash carriers normally concealed in recesses or hollows of the vehicle body, individually associated jack screws to move the sash carriers into position for distribution of the sashes horizontally along opposite sides of the vehicle body, and manipulating means accessible through an opening in the front of the rear seat of the vehicle for simultaneously rotating the jack screws.

14. A collapsible inclosure for open vehicles comprising magazine sash carriers normally concealed in recesses or hollows of the vehicle body, individually associated jack screws to move the sash carriers into position for distribution of the sashes horizontally along opposite sides of the vehicle body, and manipulating means for simultaneously rotating the jack screws including a foot treadle accessible through an opening at the front of the rear seat, and coordinated ratchet means to impart the movement of the treadle to the jack screws.

15. A collapsible inclosure for open vehicles comprising magazine carriers normally concealed in recesses or hollows at the back of the vehicle body, each of such carriers accommodating a number of sliding sashes side by side, individually associated jack screws located in the rear corner angles of the body engaging connecting means at the contiguous lower corners of the sash carriers to lift said sash carriers and incidentally to such lifting permit lateral swinging of them on the screw axes into position for horizontal distribution of the sashes along the opposite sides of the vehicle.

16. A collapsible inclosure for open vehicles comprising magazine sash carriers normally concealed in the recesses or hollows at the back of the vehicle body, individually associated jack screws in the rear corner angles of the vehicle body engaging connecting means at the contiguous lower corners of the carriers, means to rotate the jack screws in elevating the carriers, and guide means incidentally operative to swing the carriers outward into position for horizontal distribution of the sashes along opposite sides of the vehicle body, said guide means including fixedly supported rods spiralized concentrically with the jack screws and engaging openings in the connecting means aforesaid of the carriers.

17. A collapsible inclosure for open vehicles comprising magazine sash carriers normally concealed in a recess or hollow at the back of the vehicle body, individually associated jack screws to elevate the carriers and permit them to be swung outward into position for horizontal distribution of the sashes along opposite sides of the vehicle body, said carriers being connected with the screws by knuckle joint arms enabling the carriers to lie flat against each other and against the back wall of the automobile body when in stored position.

18. A collapsible inclosure for open vehicles comprising magazine sash carriers normally concealed in a recess or hollow at the back of the vehicle body, individually associated jack screws to elevate the carriers and permit them to be swung outward into position for horizontal distribution of the sashes along opposite sides of the vehicle body, said sash carriers being connected with the jack screws by knuckle joint arms with incorporated spring means capable of yielding to enable the carriers to lie flat against each other and against the rear wall of the automobile body when in stored position.

In testimony whereof, I have hereunto signed my name at Philadelphia, Pennsylvania, this sixth day of August, 1927.

JEHU T. GORE.